US006971679B2

(12) United States Patent
Legeay

(10) Patent No.: US 6,971,679 B2
(45) Date of Patent: Dec. 6, 2005

(54) CONNECTING DEVICE WITH SECURE MOUNTING

(75) Inventor: Olivier Legeay, Chartres de Bretagne (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/488,881

(22) PCT Filed: Sep. 12, 2002

(86) PCT No.: PCT/FR02/03107

§ 371 (c)(1),
(2), (4) Date: Mar. 8, 2004

(87) PCT Pub. No.: WO03/025443

PCT Pub. Date: Mar. 27, 2003

(65) Prior Publication Data
US 2004/0232693 A1  Nov. 25, 2004

(30) Foreign Application Priority Data
Sep. 20, 2001  (FR) .................................. 01 12148

(51) Int. Cl.⁷ ............................................ F16L 37/084
(52) U.S. Cl. ............................ 285/3; 285/93; 285/319; 285/81
(58) Field of Search ................... 285/3, 4, 319, 285/93, 307, 321, 81

(56) References Cited
U.S. PATENT DOCUMENTS 4,834,423 A    5/1989   DeLand
4,895,396 A *  1/1990   Washizu ....................... 285/93
4,913,467 A *  4/1990   Washizu ....................... 285/39
4,943,091 A    7/1990   Bartholomew
4,946,205 A *  8/1990   Washizu ...................... 285/319
4,948,176 A *  8/1990   Bartholomew ............... 285/93
5,161,834 A * 11/1992   Norkey ........................ 285/319
5,607,190 A *  3/1997   Exandier et al. .............. 285/93
5,897,145 A *  4/1999   Kondo et al. ................. 285/93
5,911,443 A *  6/1999   Le Quere ....................... 285/3
5,924,746 A *  7/1999   Fixemer ....................... 285/93
6,082,779 A *  7/2000   Lesser et al. ................. 285/93

FOREIGN PATENT DOCUMENTS

EP  0 448 790   10/1991
FR  2818730  *  6/2002
GB  2 258 900   2/1993

* cited by examiner

Primary Examiner—Eric K. Nicholson
(74) Attorney, Agent, or Firm—Young & Thompson

(57) ABSTRACT

Device for connecting one end of a pipe to a bore provided in a fluid transport circuit element, includes a tubular body defining an inner channel for receiving the pipe end, elements for retaining the pipe end in a predetermined axial position in the inner channel and elements for fixing the tubular body in the hole in a predetermined axial position, members for stopping the pipe end mounted on the tubular body designed to be mobile between a projecting position to counter the drive-up of the pipe end to its axial position and a retracted position to clear the passage for the pipe end towards its predetermined axial position, the stop members being designed to co-operate with the element such that they shift from their projecting position to their retracted position when the tubular body is driven in the hole up to its predetermined axial position.

7 Claims, 2 Drawing Sheets

FIG_1 ed axial position, and a retracted position so as to disengage the passage for the pipe end to go towards its predetermined axial position, and the abutment means are arranged to co-operate with the circuit element in such a manner as to pass from their projecting position to their retracted position when the tubular body is pushed into the bore as far as its predetermined axial position.

CONNECTING DEVICE WITH SECURE MOUNTING

The present invention relates to a coupling device for coupling a pipe end to a bore formed in a fluid transport circuit element. The element may be a fluid emitter element such as a pump, or a fluid receiver element such as another pipe, a tank, . . .

BACKGROUND OF THE INVENTION

A coupling device of this type generally comprises a tubular body defining an inner channel for receiving the pipe end. The pipe end is held in a predetermined axial position in the inner channel of the tubular body by retention means such as a deformable claw washer for biting into the outside surface of the pipe end or such as a latch that is movable radially between a projecting position in which the latch can be engaged behind a collar secured to the pipe end so as to oppose the pipe being withdrawn from the inner channel of the tubular body, and a retracted position in which the latch is disengaged from the collar.

The coupling device further comprises fastener means for fastening the tubular body of the coupling device in the bore of the element in a predetermined axial position. By way of example, the tubular body may be screwed into the bore of the element or it may be a force-fit therein. If it is a force-fit, the tubular body may be provided on the outside with portions in relief, for example, for improving fastening in the bore. The predetermined axial position corresponds to a position in which the strength of the fastening is good and/or to a position in which the tubular body can co-operate with seals. Such fastener means are dissociated from the retention means such as a claw washer or a radially-movable latch, i.e. these means operate independently and a pipe end can be retained in the tubular body even though the tubular body is not properly fastened in the bore. When the fastener means for fastening the tubular body in the bore are dissociated from the means for retaining the pipe end in the tubular body, there are, at present, no means for verifying that the tubular body is correctly mounted in the bore of the circuit element, other than visual inspection. This leads to a risk that an operator might fail to observe that the tubular body has not been correctly mounted. When the circuit is put under pressure, there will then be a risk of leakage, and more dangerously, of the tubular body being expelled from the bore (whiplash effect).

OBJECTS AND SUMMARY OF THE INVENTION

There therefore exists a need that has not been solved in convenient manner in the past for a coupling device of the above-specified type that can be mounted in a manner that is secure.

To this end, the invention provides a device for coupling a pipe end to a bore provided in a fluid transport circuit element, the device comprising a tubular body defining an inner channel for receiving the pipe end, retention means for retaining the pipe end in a predetermined axial position in the inner channel, and fastener means for fastening the tubular body in the bore in a predetermined axial position, the tubular body fastener means being separate from the pipe-end retention means. Abutment means for coming into abutment with the pipe end are mounted on the tubular body so as to be movable between a position in which they project into the inner channel so as to oppose entry of the pipe end as far as its predetermined axial position, and a retracted position so as to disengage the passage for the pipe end to go towards its predetermined axial position, and the abutment means are arranged to co-operate with the circuit element in such a manner as to pass from their projecting position to their retracted position when the tubular body is pushed into the bore as far as its predetermined axial position.

Thus, so long as the tubular body is not placed correctly in the bore of the circuit element, the pipe end cannot be engaged in the inner channel all the way to its predetermined axial position and it therefore cannot be secured to the tubular body. The impossibility of making the connection thus constitutes a warning signal to the user that the tubular body is not properly in place.

In a particular embodiment, the abutment means comprise at least one tongue having an end connected to the tubular body so as to be elastically deformable between a deformed state in which the tongue has a free end projecting into the inner channel, and a rest state in which the tongue has its free end retracted.

In which case, the tongue is advantageously provided with a projection adjacent to its free end and projecting towards the outside of the tubular body to co-operate with a surface of the bore, the bore having a setback for receiving the projection when the tubular body is in its predetermined axial position.

If the tubular body is not correctly mounted in the circuit element bore and a pipe end is introduced into the tubular body, the movement of introducing the pipe end into the inner channel brings the pipe end into contact with the free end of the tongue so that if the movement introducing the pipe end is continued, then the pipe end drives the tubular body into the bore until the projection comes into register with the setback in the bore. The free end then returns to its rest state in which it is retracted out from the inner channel, thereby disengaging the passage for the pipe end towards its predetermined axial position.

Also preferably, the projection possesses a radial surface forming a shoulder for co-operating with a corresponding radial surface of the setback and opposing a force tending to extract the tubular body from the bore.

The projection thus enables the tubular body to be fastened in the bore by snap-fastening.

BRIEF DESCRIPTION OF THE DRAWINGS

Other characteristics and advantages of the invention appear on reading the following description of a particular and non-limiting embodiment of the invention.

Reference is made to the accompanying drawings, in which.

DETAILED DESCRIPTION OF THE INVENTION

Figure 1:
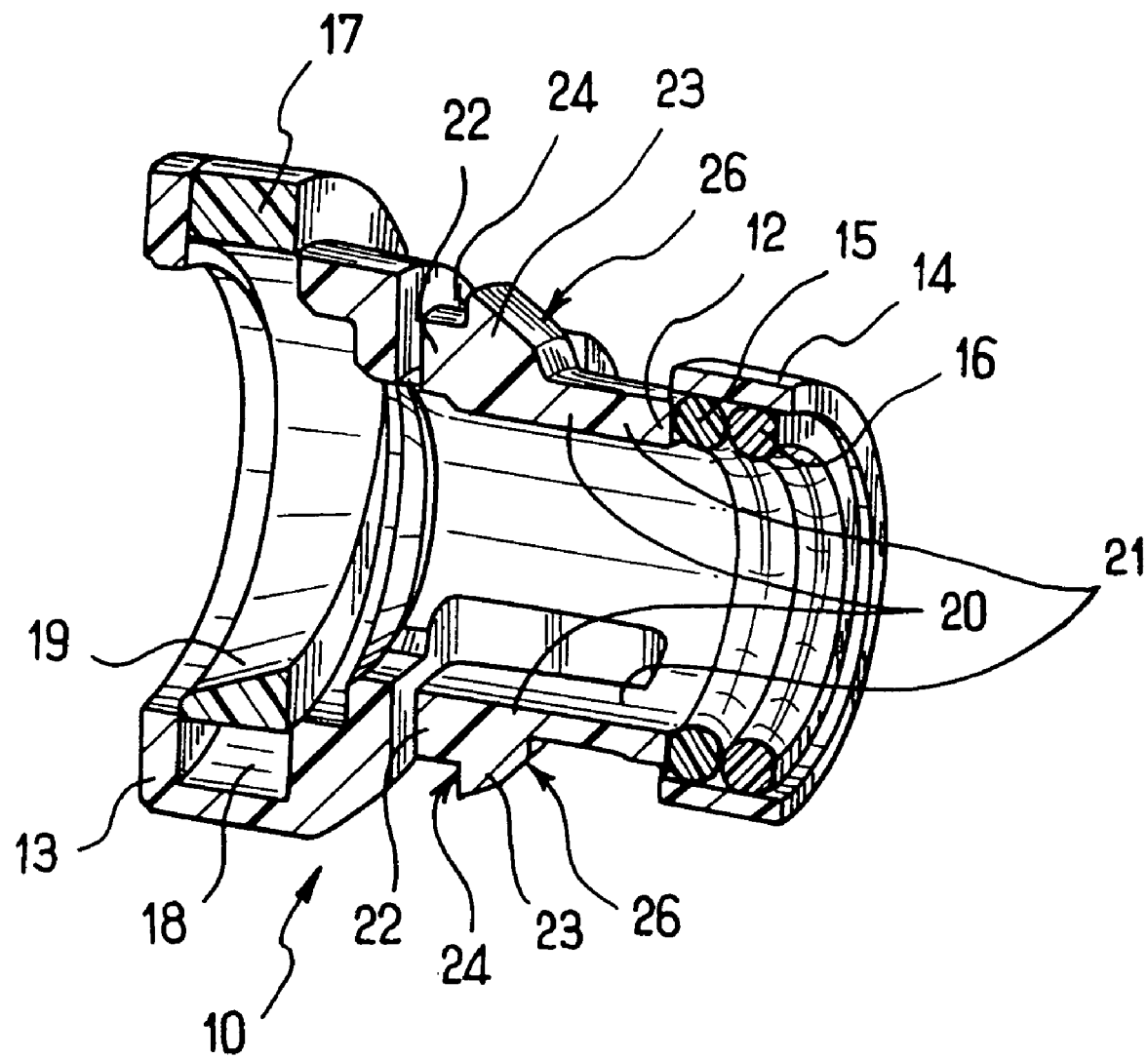
FIG. 1 is a perspective view in longitudinal section of a coupling device of the invention.

With reference to the figures, the coupling device described herein is for enabling a connection to be made between a pipe end provided with an outside collar 2 and a bore 3 of a fluid transport circuit element 4, such as a fluid receiver element like a tank or a fluid emitter element like a pump.

The bore 3 opens to the outside via two consecutive chambers of increasing diameter, namely an intermediate chamber 5 and an entry chamber 6. A shoulder 7 forms the transition between the entry chamber 6 and the intermediate chamber 5, and a shoulder 8 forms the transition between the intermediate chamber 5 and the nominal section of the bore 3. The bore 3 includes two setbacks formed by diametrically-opposite slots 9 formed in the entry chamber 6 to open to the outside of the element 4.

The coupling device of the invention comprises a tubular body given overall reference 10 which defines an inner channel 11 for receiving the pipe end 1 and which possesses an end 12 via which the tubular body 10 is designed to be introduced into the bore 3 of the element 4, and an opposite end 13 via which the pipe end 1 is to be introduced into the inner channel 11.

The end 12 is fitted with a bushing 14 which forms a support for seals 15 and 16 (O-rings) of inside diameter corresponding to an outside diameter of the pipe end 1 and of outside diameter corresponding to an inside diameter of the bushing 14 itself corresponding substantially to an outside diameter of the end 12 of the tubular body 10 and to an inside diameter of the intermediate chamber 5. The bushing 14 has an outside diameter corresponding to an inside diameter of the entry chamber 6. The bushing 14 is connected to the end 12 of the tubular body 10 by a breakable connection (a breakable web) which breaks under an axial compression force.

The end 13 of the tubular body 10 is shaped to contain a latch in the form of a ring 17 which, in conventional manner, forms a retractable transverse obstacle for the outer collar 2 on the pipe end 1. The body end 13 thus includes a chamber 18 into which the inner channel 11 opens out and serving to receive the ring 17 which, at rest, is urged by resilient tabs (not shown in the figures) so that the ring 17 is shifted to lie off the axis of the inner channel 11. The innermost portion of the chamber 18 forms a housing for the collar 2 on the pipe end 1 and in which it is held axially by the ring 11 when in its rest state, thereby defining an axial retention position for the pipe end 1 in the inner channel 11 (see FIG. 3). It will be understood that when the collar 2 goes past, the ring 17 retracts (downwards in the figures) because of a camming slope 19 so as to lie on the axis of the inner channel 11, and then returns to its rest position under drive from the resilient return tabs after the collar 2 has gone beyond the ring 17. In order to unlock the coupling device, the operator needs to press on the ring 17 against the resilient tabs so as to release the collar axially from the chamber 18.

The tubular body 10 also comprises abutment means for the terminal face of the pipe end 1. These abutment means comprise two tongues 20 extending axially in the tubular body in diametrically-opposite positions and each having one end 21 connected to the tubular body 10 and an opposite end 22 that is free. The tongues 20 are elastically deformable between a deformed state in which the free ends 22 project into the inner channel 11, and a rest state in which the free ends 22 are retracted. The tongues 20 are provided beside their adjacent ends 22 with respective projections 23 projecting towards the outside of the tubular body 10. The distance between the projections 23 is greater than the inside diameter of the entry chamber 6 when the tongues 20 are in their rest state, and is substantially equal to the inside diameter of the entry chamber 6 when the tongues 20 are in their projecting state.

At its rearward end relative to the insertion direction of the tubular body 10 into the bore 3, each projection 23 possesses firstly a radial surface 24 to constitute a shoulder for co-operating with a corresponding radial surface 25 of the slot 9 so as to oppose a force tending to extract the tubular body 10 from the bore 3, and at its front end, it possesses secondly a sloping surface forming a ramp 26 for co-operating with the edge of the entry chamber 6 of the bore 3 so as to bring the tongue 20 into its deformed state (which edge may also be chamfered in order to make this co-operation easier). The slots 9 and the projections 23 thus form means for fixing the tubular body in the bore 3 by snap-fastening.

Figure 2:
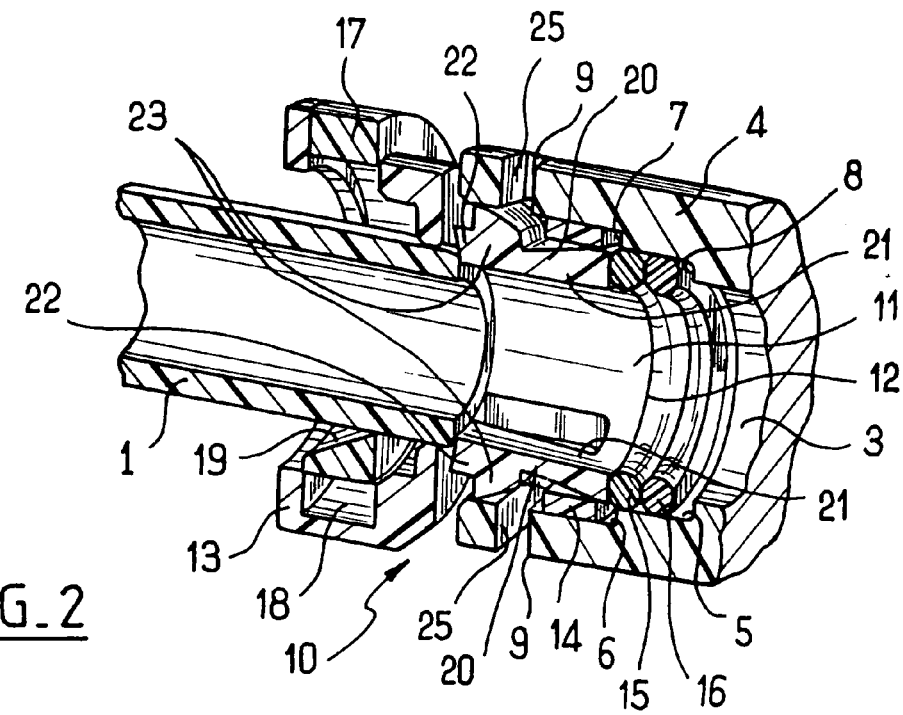
FIG. 2 is view analogous to FIG. 1 showing a coupling device incorrectly mounted while a pipe end is being introduced therein.

The coupling device is assembled to the element 4 by snap-fastening the tubular body 10 in the bore 3 of the element 4. The tubular body 10 is introduced into the bore 3 via its end 12 in such a manner that the ramps 26 of the projections 23 come into contact with the edge of the entry chamber 6 of the bore 3 in the element 4 and cause the tongues 20 to be deformed away from their rest state towards their deformed state. The free ends 22 of the tongues 20 then project into the inner channel 11. In FIG. 2, it can be seen that if the pipe end 1 is engaged in the tubular body 10 at this stage, then its terminal face comes into abutment against the free ends of the tongues 20. The distance between the free ends 22 and the ring 17 is shorter than the distance between the collar 2 and the terminal face at the pipe end 1 so that it is not possible for the pipe to be retained by the ring 17 so long as the tongues 20 are in their deformed state. The operator is thus informed that the tubular body 10 has been incompletely mounted in the bore.

With continued movement introducing the tubular body 10 into the bore 3 (under drive from the operator handling either the tubular body 10 itself when the pipe end 1 is not engaged therein, or else the pipe end 1 pressing against the free ends 22 during introduction of the pipe into the tubular body 10), the projections 23 come into register with the slots 9 so that the tongues 20 can return elastically to their rest state. The projections 23 received in the slots 9 then oppose any force tending to extract the tubular body 10 from the bore 3, thus defining the axial position in which the tubular body 10 is secured in the bore 3. Means can be provided for indexing the tubular body 10 relative to the bore 3 so as to ensure that the projections 23 are in alignment with the slots 9 when the tubular body 10 reaches the axial position in which it is to be secured. Otherwise, the projections can be put into register with the slots 9 by turning the tubular body 10 in the bore 3. In addition, the slots 9 may be replaced by a groove, thus avoiding the need to provide any indexing.

During the movement of introducing the tubular body 10 into the bore 3, the bushing 17 becomes detached on encountering the shoulder 8 and is moved onto the end 12. In this state, the intermediate chamber 5 receives the two O-rings 15 and 16.

Figure 3:
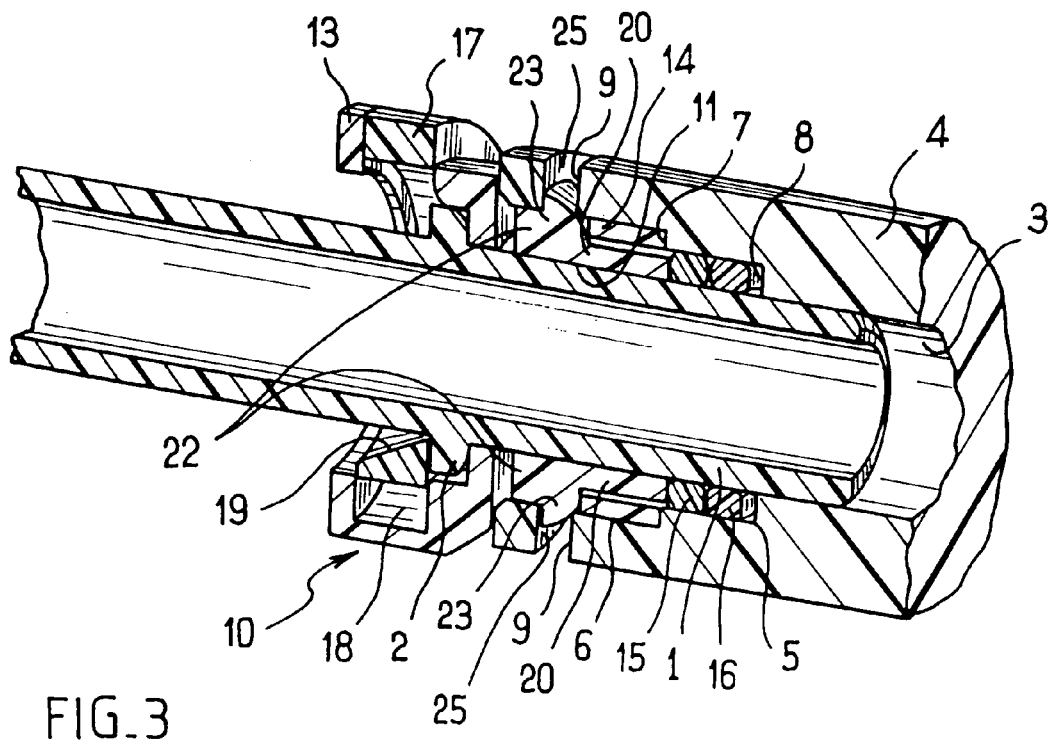
FIG. 3 is a view analogous to FIG. 2 showing the coupling device once the pipe end has been inserted therein.

In FIG. 3, the pipe end 1 is shown secured inside the tubular body 10 and engaged in the inner channel 11 thereof. The length of the pipe end 1 extending beyond the collar 2 is such that the pipe end 1 in its retention position inside the tubular body 10 reaches the O-rings 15 and 16.

It will also be observed that the slots 9 constitute setbacks giving access to the projections 23 and, in the absence of a pipe end 1 engaged in the tubular body 10 they make it possible with a suitable tool to push in the projections 23 so as to allow the tubular body 10 to be extracted from the bore 3.

Naturally, the invention is not limited to the embodiment described and various embodiments can be provided without going beyond the ambit of the invention as defined by the claims.

In particular, fastener modes other than snap-fastening can be envisaged.

Furthermore, the fastening means may be separate from the abutment means.

In addition, the invention also relates to devices that are the result of inverting the configuration of the device described.

Furthermore, the retention means may be different from those described and may comprise, for example, a claw washer disposed downstream from the abutment means so that the abutment means prevent or open access for the pipe end to the washer depending on whether they are in their projecting position or in their retracted position.

What is claimed is:

1. A device for coupling a pipe end (1) to a bore (3) provided in a fluid transport circuit element (4), the device comprising a tubular body (10) defining an inner channel (11) for receiving the pipe end, retention means (17) attached to the tubular body for retaining the pipe end in a predetermined axial position in the inner channel, and fastener means (23) attached to the tubular body for fastening the tubular body in the bore in a predetermined axial position, the tubular body fastener means being independent from the pipe-end retention means, wherein abutment means (22) for coming into abutment with the pipe end are mounted on the tubular body so as to be movable between a position in which they project into the inner channel so as to oppose entry of the pipe end as far as its predetermined axial position, and a retracted position so as to disengage the passage for the pipe end to go towards its predetermined axial position, and wherein the abutment means (22) are arranged to co-operate with the circuit element in such a manner as to pass from their projecting position to their retracted position when the tubular body is pushed into the bore as far as its predetermined axial position.

2. A device according to claim 1, in which the abutment means comprise at least one tongue (20) having an end (21) connected to the tubular body (10) so as to be elastically deformable between a deformed state in which the tongue has a free end (22) projecting into the inner channel (11), and a rest state in which the tongue has its free end retracted.

3. A device according to claim 2, in which the tongue (20) is provided with a projection (23) adjacent to its free end (22) and projecting towards the outside of the tubular body (10) to co-operate with a surface of the bore (3), the bore having a setback (9) for receiving the projection when the tubular body is in its predetermined axial position.

4. A device according to claim 3, wherein the projection (23) possesses a radial surface (24) forming a shoulder for co-operating with a corresponding radial surface (25) of the setback (9) and opposing a force tending to extract the tubular body (10) from the bore (3).

5. A device according to claim 3, wherein the setback is formed by a slot (9) opening to the outside of the element (4) so as to give access to the projection (23) from outside the element.

6. A coupling device according to claim 5, in which the tubular body (10) possesses an end (12) for insertion into the bore (3), which end is extended by at least one seal (15, 16) by means of a cylindrical support (14) temporarily projecting from said end, the seal being arranged, in operation, to provide sealing between the circuit element (4) and the pipe end (1).

7. A device according to claim 6, in which the cylindrical support of the seal (15, 16) is formed by a bushing (14) connected to the above-mentioned end of the tubular body (10) by breakable means so as to be capable of retracting around said end of the tubular body when the tubular body is mounted in the bore of the circuit element.

* * * * *